United States Patent

[11] 3,547,331

[72] Inventor John R. Hereford
2400 Bluegrasse Lane, Florissant, Mo. 63033
[21] Appl. No. 703,077
[22] Filed Feb. 5, 1968
[45] Patented Dec. 15, 1970

[54] INTERMITTENT ADVANCING MECHANISM FOR FILM IN A PULSE CAMERA OR THE LIKE
8 Claims, 2 Drawing Figs.
[52] U.S. Cl. ................................................ 226/114;
242/190; 352/159
[51] Int. Cl. ............................................ B65h 17/42
[50] Field of Search ........................................ 352/159,
187; 226/44, 113, 114; 242/186, 189, 190

[56] References Cited
UNITED STATES PATENTS
2,005,738 6/1935 Foster .......................... 242/189
2,878,015 3/1959 Panissidi ...................... 226/156
3,318,544 5/1967 Jones ........................... 242/190

Primary Examiner—Richard A. Schacher
Attorney—Koenig, Senninger, Powers and Leavitt ABSTRACT: In a pulse camera, the film travels from a supply spool around a film-metering roller, through a gate, around a loop-forming roller, and thence to a takeup spool. The metering roller has an escapement for intermittently releasing it to permit advance of a frame of film to the gate. The loop-forming roller is movable and spring-biased for pulling a loop in the film between the gate and the takeup spool, thereby acting to pull a frame of the film through the gate on release of the metering roller, with accompanying increase in the size of the loop. After advance of a number of frames, a switch is actuated by movement of the loop-forming roller to energize a motor for driving the takeup spool, and the latter then functions to take up film from the loop with accompanying decrease in the size of the loop to the point where the switch is deactuated and the motor stopped.

PATENTED DEC 15 1970

3,547,331

John R. Hereford
Inventor.
Koenig, Senniger,
Powers and Leavitt,
Attorneys.

3,547,331

INTERMITTENT ADVANCING MECHANISM FOR FILM IN A PULSE CAMERA OR THE LIKE

BACKGROUND OF THE INVENTION

This invention relates to film-advancing mechanisms for pulse cameras, although principles of the invention may be applicable to intermittent advancing mechanisms for strips in general. It is desirable, as to certain uses for such cameras, e.g., recording on microfilm of data from a cathode ray tube display device, that the time between exposures be minimized, and this in conjunction with other requirements, e.g., maintaining the film taut in the gate of the camera, has presented problems.

SUMMARY OF THE INVENTION

The invention has as its principal object the provision of an improved advancing mechanism, particularly for pulse cameras, which enables minimization of time between successive strip or film advance cycles, at the same time maintaining the strip or film taut, and which is of economical construction and reliable in operation. In general, this is accomplished by providing a takeup (e.g., a spool) for the strip or film with an intermittently operable drive. Means is provided for intermittently feeding forward a measured length of the strip from a supply (e.g., a supply spool) toward the takeup and accumulating the amount of strip so fed forward with the takeup in or out of operation. Means acts in response to accumulation of a predetermined amount of strip (resulting from a number of strip-advancing cycles) for actuating the drive for the takeup to take up the accumulation. Other objects and features will be in part apparent and in part pointed out hereinafter.

BRIEF DESCRIPTION OF THE DRAWING

Corresponding reference characters indicate corresponding parts throughout the drawing.

DESCRIPTION OF THE PREFERRED EMBODIMENT

Figure 2:
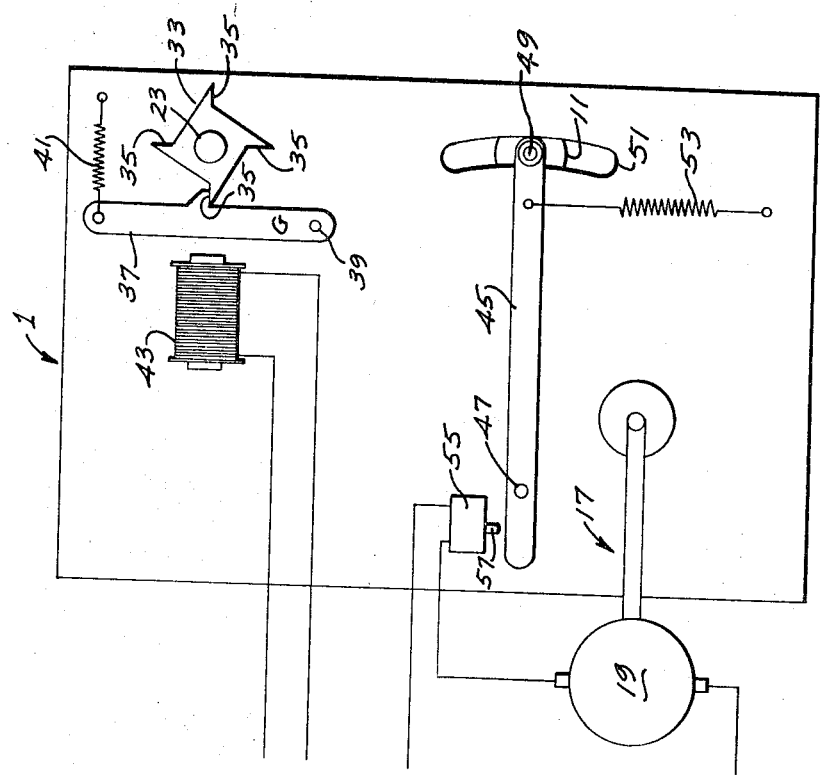
FIG. 2 is a rear elevation of the mechanism shown in FIG. 1.

Referring to the drawing, there is indicated at 1 the mechanism plate of a pulse camera. A film supply spool 3 is mounted at 5 on the front of this plate. The supply spool 3 is free to rotate for unwinding of film F therefrom. It may be suitably braked for film-tensioning purposes. Film passes from the supply spool through a film-metering means 7, thence through the gate 9 of camera, thence around loop-forming means comprising a loop-forming roller 11 and an idler roller 13, and thence to a takeup means constituted by a takeup spool 15. The takeup spool 15 is adapted to be driven in the direction for winding up the film (counterclockwise as viewed in FIG. 1) by a drive 17 including an electric motor 19. Details of this drive are not critical, except that it is an antireverse drive, allowing rotation of the takeup spool only in takeup direction and preventing rotation of the takeup spool in reverse direction.

The film-metering means 7 comprises a metering idler roller or capstan 21 secured on a shaft 23 journaled in the plate 1, around which the film F passes in its path from the supply spool 3 to the gate 9. A presser roller 25 presses the film against the metering roller. As shown, the presser roller is mounted on an arm 27 pivoted at 29 on plate 1, and biased toward the metering roller by a spring 31. On the rear end of the metering roller shaft 23, in back of plate 1, is a ratchet or escapement 33. As shown, this has four teeth 35 spaced at 90° intervals. The number of teeth may vary. A pawl 37 pivoted at 39 on the back of plate 1 is biased by a spring 41 toward engagement with the ratchet. The pawl is adapted to be withdrawn from engagement with the ratchet by an electromagnet 43.

The loop-forming roller 11 is mounted at one end of a lever 45 pivoted at 47 on the back of the plate 1. Roller 11 is carried by a pin 49 which extends forward from this end of the lever through an arcuate slot 51 in the plate. This slot is on an arc centered in pivot 47, so that the roller 11 may move up and down along this arc. A spring 53 biases lever 45 to swing clockwise as viewed in FIG. 2, thereby tending to pull the roller 11 downward. The film F passes from the gate 9 downward on one side of roller 11, around the bottom of roller 11, and thence upward and around idler roller 13 and downward to the takeup spool, roller 11 functioning (via the bias of spring 53) to pull a loop L in the film between the gate 9 and the takeup spool.

Operation of the motor 17 is controlled by a switch 55 mounted on the back of plate 1, this switch in turn being controlled by the lever 45. For this purpose, the end of the lever 45 opposite its roll-carrying end is engageable with the button 57 of the switch to energize the motor when the lever swings clockwise as viewed in FIG. 2 to a predetermined extent, the motor being deenergized when the lever swings back counterclockwise as viewed in FIG. 2 to release the switch button.

Figure 1:
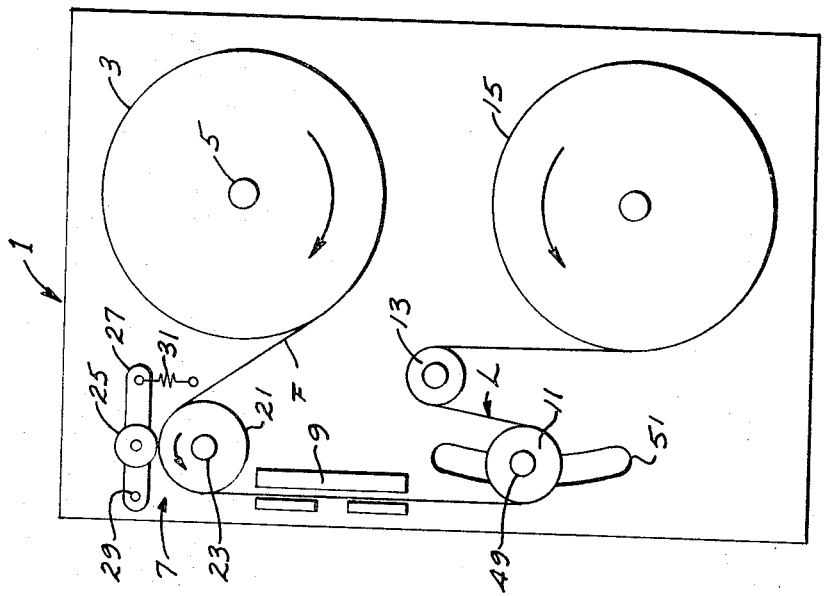
FIG. 1 is a view in front elevation of a mechanism plate of a pulse camera showing the supply spool, takeup spool, metering means and loop-forming means of an advancing mechanism of this invention.

Operation is as follows:

FIGS. 1 and 2 show the parts of the film-advancing mechanism in what may be regarded as a starting position, wherein the left end of the lever 45 has just swung to a position releasing switch button 57 so that the motor 17 is deenergized. The pawl 37 is engaged with a tooth 35 of ratchet 33, locking the metering roller 21 against rotation in film-advancing direction (counterclockwise as viewed in FIG. 1). The loop-forming roller 11, under the bias of spring 53 acting on lever 45, pulls down on the loop L of film between the locked roller 21 and the idler to roller 13. With the takeup spool 15 locked against reverse rotation, the film is maintained under tension from roller 21 to the takeup spool, and thus maintained under tension in the gate 9.

After the frame of film in the gate 9 has been exposed, a pulse of current is transmitted by suitable means to the electromagnet 43. This momentarily draws the pawl 37 out of engagement with the ratchet 33 for releasing the metering roller 21 for an advance cycle of the film to forward the next film frame into the gate. The advance of the film, upon release of the roller 21, occurs by reason of the loop-forming roller 11, under the bias of spring 53, pulling a length of film from the supply spool 3, with accompanying increase in the size of the loop L. The film advances until the next tooth 35 on ratchet 33 engages the pawl 37 (which has been released on termination of the current pulse to electromagnet 43) to relock the metering roller 21. It will be observed that, with a four-tooth ratchet as herein illustrated, the film advance equals one-fourth the circumference of the metering roller 21, and this equals one film frame.

Upon a number of film advance cycles as above described, with increase in the size of loop L on each cycle, the loop-forming roller 11 reaches the lower limit of its travel, as determined by actuation of switch 55 by lever 45 to energize the motor 17. The latter thereupon drives takeup spool 15 to wind up the film. Since the film is arrested at roller 21, the takeup spool, in winding up film, takes up film from the loop L, causing it to decrease in size and raising the loop-forming roller 11 to the point where the end of lever 45 disengages from the button 57 of switch 55 to deenergize the motor 17. The latter comes to a stop, bringing the parts back to the starting position shown in the drawing.

It will be observed that the successive film advance cycles are brought about by the pulsed release of the film-arresting metering idler roller 21 and the action of the spring-biased loop-forming roller 11 to pull loop L in the film, with incremental increase in the size of the loop to the point where motor 17 is energized to bring the loop back to its minimum size. Thus, the film advance through the gate is in effect independent of the windup of film by the takeup spool, the latter functioning only after a number of film advance cycles for taking up film accumulated in the loop L during these advance cycles. The film advance may therefore be quite rapid, and the time between successive exposures minimized. It may be desirable yieldingly to mount idler roller 13 or otherwise provide for absorbing the shock which occurs on arrest of the film by engagement of a tooth 35 on ratchet 33 with the pawl 37, to avoid breaking the film, noting that, on termination of the rapid advance of a frame of the film, the film may be subjected to considerable stress in tension.

It will appear that the metering roller 21 and the associated ratchet and pawl mechanism in conjunction with the spring-biased loop-forming roller 11 constitute means for intermittently feeding forward a measured length of the film F (one frame of the film) and accumulating the amount of film so fed forward with the takeup spool 15 in or out of operation. Switch 55 actuated by lever 45 acts in response to accumulation of a predetermined amount of strip for actuating drive motor 17 to drive the takeup spool 15 to take up the accumulation.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. Intermittent advancing mechanism for continuous strip comprising means for holding a supply of strip, means for taking up the strip fed from the supply, means for intermittently driving said takeup means, said takeup means being operable only in takeup direction, means operable on strip forwarded from the supply for arresting forward movement of the strip and operable intermittently to release the strip for intermittent advance of the strip in cycles, said arresting means comprising an idler roller around which the strip travels in its path from the supply to the loop-forming means, said idler roller constituting a metering roller, escapement means for said idler roller for holding it against rotation in forward direction and releasable to allow said idler roller to rotate freely in forward direction through a predetermined angle for a strip advance cycle, means for intermittently releasing said escapement means, loop forming means for pulling a loop in the strip between said idler roller and the takeup means thereby to pull film from the supply upon said release of said idler roller and the strip with accompanying increase in the size of the loop, and means responsive to predetermined increase in the size of the loop after a number of strip advance cycles for actuating said driving means to take up the strip from the loop with accompanying decrease in the size of the loop and stopping the driving means upon predetermined decrease in the size of the loop.

2. Intermittent advancing mechanism as set forth in claim 1 wherein said takeup means comprises a takeup spool, said driving means comprises an electric motor, and said means responsive to increase and decrease of the size of the loop comprises a switch for energizing the motor in response to said predetermined increase in the size of the loop and for deenergizing the motor in response to said predetermined decrease in the size of the loop.

3. Intermittent advancing mechanism as set forth in claim 2 wherein said loop-forming means comprises a loop-forming roller around which the strip travels in its path from the arresting means to the takeup spool, said loop-forming roller being movable in one direction for increase in the size of the loop and in the opposite direction for decrease in the size of the loop, spring means biasing said loop-forming roller in said one direction, and means for operating the switch in response to movement of the loop-forming roller.

4. Intermittent advancing mechanism as set in claim 3 wherein said escapement means comprises a ratchet rotatable with the idler roller, a pawl for the ratchet, and said releasing means comprises means for intermittently releasing the pawl from the ratchet and allowing it to return.

5. In a pulse camera having a film gate, a spool for holding a supply of film to be fed step by step through the gate, and a takeup spool for winding up film fed through the gate, means for intermittently driving the takeup spool, said takeup spool being operable only in takeup direction, means operable on the film between the supply spool and the gate for arresting forward movement of the film and operable intermittently to release the film for intermittent advance thereof through the gate in cycles, said arresting means comprising an idler roller around which the film travels in its path from the supply spool to the gate, said idler roller constituting a metering roller, escapement means for said idler roller for holding it against rotation in forward direction and releasable to allow said idler roller to rotate freely in forward direction through a predetermined angle for a strip advance cycle, means for intermittently releasing said escapement means, loop-forming means for pulling a loop in the film between the gate and the takeup spool thereby to pull film from the supply through the gate upon said release of the film with accompanying increase in the size of the loop, and means responsive to predetermined increase in the size of the loop after a number of film advance cycles for actuating said driving means to take up the film from the loop with accompanying decrease in the size of the loop and stopping the driving means upon predetermined decrease in the size of the loop.

6. In a pulse camera as set forth in claim 5, said driving means comprising an electric motor, and said means responsive to increase and decrease in the size of the loop comprising a switch for energizing the motor in response to said predetermined increase in the size of the loop and for deenergizing the motor in response to said predetermined decrease in the size of the loop.

7. In a pulse camera as set forth in claim 6, said loop-forming means comprising a loop-forming roller around which the film travels in its path from the arresting means to the takeup spool, said loop-forming roller being movable in one direction for increase in the size of the loop and in the opposite direction for decrease in the size of the loop, spring means biasing said loop-forming roller in said one direction, and means for operating the switch in response to movement of the loop-forming roller.

8. In a pulse camera as set forth in claim 7, said escapement means comprising a ratchet rotatable with the idler roller, a pawl for the ratchet, and said releasing means comprising means for intermittently releasing the pawl from the ratchet and allowing it to return.